(12) United States Patent
Carette et al.

(10) Patent No.: US 10,755,823 B2
(45) Date of Patent: Aug. 25, 2020

(54) SAMPLE HOLDER FOR MEASURING NUCLEAR HEATING IN A NUCLEAR REACTOR, AND CALORIMETRIC CELL INCLUDING AT LEAST ONE SUCH SAMPLE HOLDER

(71) Applicants: COMMISSARIAT A L'ENERGIE ATOMIQUE ET AUX ENERGIES ALTERNATIVES, Paris (FR);
UNIVERSITE D'AIX-MARSEILLE, Marseilles (FR)

(72) Inventors: Michel Carette, Marseilles (FR);
Abdallah Lyoussi, Manosque (FR);
Julie Brun, Martigues (FR); Christelle Reynard-Carette, Marseilles (FR);
Jean-François Villard, Mirabeau (FR);
Philippe Guimbal, Le Kremlin Bicetre (FR)

(73) Assignees: COMMISSARIAT A L'ENERGIE ATOMIQUE ET AUX ENERGIES ALTERNATIVES, Paris (FR);
UNIVERSITE D'AIX-MARSEILLE, Marseilles (FR)

( * ) Notice: Subject to any disclaimer, the term of this patent is extended or adjusted under 35 U.S.C. 154(b) by 335 days.

(21) Appl. No.: 15/565,119

(22) PCT Filed: Apr. 8, 2016

(86) PCT No.: PCT/EP2016/057727
§ 371 (c)(1),
(2) Date: Oct. 6, 2017

(87) PCT Pub. No.: WO2016/162470
PCT Pub. Date: Oct. 13, 2016

(65) Prior Publication Data
US 2018/0090236 A1 Mar. 29, 2018

(30) Foreign Application Priority Data

Apr. 10, 2015 (FR) ..................................... 15 53136

(51) Int. Cl.
*G01K 17/00* (2006.01)
*G21C 17/112* (2006.01)
(Continued)

(52) U.S. Cl.
CPC ............ *G21C 17/112* (2013.01); *G01K 17/00* (2013.01); *G01N 25/20* (2013.01); *G01K 17/04* (2013.01); *G01K 17/08* (2013.01); *G01N 23/09* (2013.01)

(58) Field of Classification Search
CPC ........ G01K 17/00; G01K 17/04; G01K 1/143; G01K 17/112; G01K 15/00; G01K 13/00;
(Continued)

(56) References Cited

U.S. PATENT DOCUMENTS 3,165,446 A * 1/1965 Untermyer, II ........ G21C 17/10
376/254
3,246,153 A * 4/1966 Lewis ....................... G01T 1/12
250/390.01
(Continued)

FOREIGN PATENT DOCUMENTS

DE 1648864 A1 * 7/1971 ............. G21C 17/10
FR 1 452 745 A 4/1966
(Continued)

OTHER PUBLICATIONS

H. Carcreff et al., "Development, Calibration and Experimental Results Obtained with an Innovative Calorimeter (CALMOS) for Nuclear Heating Measurements," IEEE 2011 2nd International Conference on Advancements in Nuclear Instrumentation Measurement Methods and Their Applications, Jun. 6, 2011, pp. 1-8, XP032153525.
(Continued)

*Primary Examiner* — Gail Kaplan Verbitsky
(74) *Attorney, Agent, or Firm* — Baker & Hostetler LLP (57) ABSTRACT

A sample holder for the measurement of nuclear heating in a nuclear reactor, comprises: a body configured to contain a heat-sensitive sample along a longitudinal axis; and means for removing heat from the body to the exterior of the
(Continued)

sample holder, wherein the means for removing heat from the body to the exterior of the sample holder comprise: a peripheral structure located on the periphery of the body; and a central structure mechanically linking the body and the peripheral structure, the central linking structure being configured to transfer heat radially, i.e. perpendicularly to the longitudinal axis, between the body and the peripheral structure. A calorimeter cell for the measurement of nuclear heating in a nuclear reactor, comprises: at least one sample holder; a seal-tight casing in which the sample holder is placed; and temperature-measuring means.

17 Claims, 8 Drawing Sheets

(51) Int. Cl.
*G01N 25/20* (2006.01)
*G01K 17/08* (2006.01)
*G01N 23/09* (2018.01)
*G01K 17/04* (2006.01)

(58) Field of Classification Search
CPC ..... G01K 15/005; G01K 17/08; G01J 5/0003; G01N 23/09; G01N 25/20; G01T 1/12
USPC .......... 374/30–39, 208, 10–12, 179; 422/51; 436/147
See application file for complete search history.

(56) References Cited

U.S. PATENT DOCUMENTS

| | | | | |
|---|---|---|---|---|
| 3,558,047 | A | * | 1/1971 | Nuernberg ............... G21D 9/00 376/323 |
| 3,995,485 | A | * | 12/1976 | Beyer ...................... G01K 7/20 374/33 |
| 4,620,800 | A | | 11/1986 | Anno |
| 6,422,742 | B1 | * | 7/2002 | Kinoshita .......... G01N 25/4866 374/10 |
| 7,802,916 | B2 | * | 9/2010 | Teramoto ............... G01N 25/20 374/1 |
| 8,147,133 | B2 | * | 4/2012 | Ellison ................... G01K 17/00 374/12 |

FOREIGN PATENT DOCUMENTS

| | | | |
|---|---|---|---|
| FR | 2 968 448 A1 | 6/2012 | |
| FR | 2968448 A1 | * 6/2012 | ........... G21C 17/112 |
| GB | 1072667 A | * 6/1967 | ............. G21C 1/303 |

OTHER PUBLICATIONS

D. Fourmentel et al., "Nuclear Heating Measurements in Material Testing Reactor: A Comparison Between a Differential Calorimeter and a Gamma Thermometer," IEEE Transactions on Nuclear Science, vol. 60, No. 1, 2013, pp. 328-335.

M. Tarchalski et al., "Principle of calibration of the simple calorimeter for nuclear heating measurements in MARIA reactor and transposition to the case of JHR reactor," ANIMMA, Jun. 23-27, 2013, ISBN: 978-1-4799-1046-5.

* cited by examiner

SAMPLE HOLDER FOR MEASURING NUCLEAR HEATING IN A NUCLEAR REACTOR, AND CALORIMETRIC CELL INCLUDING AT LEAST ONE SUCH SAMPLE HOLDER

CROSS-REFERENCE TO RELATED APPLICATIONS

This application is a National Stage of International patent application PCT/EP2016/057727, filed on Apr. 8, 2016, which claims priority to foreign French patent application No. FR 1553136, filed on Apr. 10, 2015, the disclosures of which are incorporated by reference in their entirety.

FIELD OF THE INVENTION

The invention relates to a sample holder for the measurement, on-line, of heating in nuclear reactors.

It also relates to a calorimeter cell comprising at least one sample holder according to the invention.

It particularly applies to the field of the nuclear industry.

BACKGROUND

Nuclear heating is in particular induced by the radiation of photons and neutrons that exist within a nuclear reactor. The measurement of nuclear heating allows the field of radiation in a nuclear reactor (core and reflector/periphery) to be indirectly accessed.

The deposition of energy per unit weight and time (W/g) by radiative interactions (neutrons and photons)/matter is called nuclear heating.

Neutron radiation and more precisely the number of neutron particles, also called neutron fluence or flux, may be quantified using specific systems such as fission chambers, self-powered detectors or even activation detectors. Photon radiation may for its part be quantified using specific systems such as ionization chambers or self-powered detectors. Neutron and photon radiation has the property of depositing its energy into matter, and therefore of heating it. By matter, what is meant is matter contained in nuclear reactors, for example the structures of the reactor, experimental devices, and any materials present in the core of the reactor (including the nuclear fuel).

Mention is made of quantifying the amount of overall nuclear heating produced by the radiation, rather than the flux of particles, in order to determine the effect of this radiation.

This is particularly appropriate in experimental nuclear reactors in which the internal structures and systems (experimental devices for example) differ depending on the experimental channel and depending on the experimental program.

It is all the more necessary to measure nuclear heating in experimental nuclear reactors because it is a key quantity that must be taken into account when dimensioning experimental devices, in particular from the point of view of their mechanical strength, and their thermal withstand.

Nuclear heating is conventionally measured by a calorimetric method. Calorimetric methods essentially consist in determining the nuclear heating of a small piece of material, or sample, the mass of which is known by measurement of one or more temperature increases or one or more temperature differences.

In the rest of the description, this small piece of material will be referred to as the sample.

The sample is conventionally made of graphite.

The temperature increase or temperature difference may be due to photon and neutron radiation. It may also be due, possibly in combination with radiation, to a heating system integrated into the calorimeter, for example for the purpose of calibrating the calorimeter outside of the reactor or of implementing, in a reactor, the measurement protocols said to be "de zéro" and "d'addition de courant". Such measurement protocols are described in the patent FR 2 968 448.

A differential calorimeter is commonly used. In this case, the calorimeter comprises two sample holders. The measurement of nuclear heating with a differential calorimeter is based on a double temperature difference between two essentially identical sample holders, a first sample holder being full, i.e. containing a sample of material for which the deposited energy must be measured, and a second empty sample holder serving as reference. The deposited energy is deduced from this double temperature difference between the two sample holders, and conventionally expressed in W/g. The temperatures may be measured by thermocouples.

One type of sample holder and one type of differential calorimeter are described in the publication "*Nuclear Heating Measurements in Material Testing Reactor: a Comparison Between a Differential calorimeter And a Gamma Thermometer*, D. Fourmentel, C. Reynard-Carette, A. Lyoussi, J. F. Villard, J. Y. Malo, M. Carette, J. Brun, P. Guimbal, Y. Zerega, IEEE Transactions on Nuclear Science, Volume 60, Issue:1, Part:2, Publication Year: 2013, Page(s): 328-335".

The differential calorimeter is a non-adiabatic calorimeter insofar as heat is exchanged between the calorimeter and a heat-transfer fluid exterior to the calorimeter. It comprises two sample holders.

Each sample holder comprises 3 portions: a head, a base and a rod axially connecting the head and the base. The 3 portions lying longitudinally on the same axis. A first thermocouple is located at the base of the head, level with its link with the rod. A second thermocouple is located in the middle of the base.

Another type of sample holder is described in the publication "*Principle of calibration of the simple calorimeter for nuclear heating measurements in MARIA reactor and transposition to the case of JHR reactor.*, M. Tarchalski, K. Pytel, P. Siréta, A. Lyoussi, J. Jagielski, C. Reynard-Carette, C. Gonnier, G. Bignan, ANIMMA 2013, 23-27 June, Marseille, France, ISBN: 978-1-4799-1046-5".

The sample holder contains a cylindrical central sample mounted in a stainless steel casing. A gas-filled space is provided between the cylindrical sample and the casing. A thermocouple is inserted into the center of the central sample. Another thermocouple is fastened to the exterior of the casing. The temperature difference is measured between the two thermocouples.

Beyond a certain level of deposited energy, the sample holder according to this publication does not allow heat to be removed from the sample because a layer of insulating gas surrounds the sample (high induced temperatures). Specifically, FIG. 2 of this publication shows that temperature decreases radially essentially to the level of the layer of gas. To remove high levels of deposited energy, it is necessary to decrease the thickness of the layer and/or modify the nature of the gas.

In both the aforementioned publications, the sample holders and calorimeters do not promote radial heat exchange.

One objective of the invention is to provide, in response to this problem, a sample holder and a calorimeter cell comprising at least one such sample holder.

SUMMARY OF THE INVENTION

For this reason and in this context, the subjects of the present invention are a new configuration for a sample holder for the measurement of nuclear heating in a nuclear reactor and a calorimeter cell including the sample holder of the invention.

More precisely, one subject of the invention is a sample holder, for the measurement of nuclear heating in a nuclear reactor, comprising:

a body configured to contain a heat-sensitive sample along a longitudinal axis; and means for removing heat from the body to the exterior of the sample holder; characterized in that the means for removing heat from the body to the exterior of the sample holder comprise:

a peripheral structure located on the periphery of said body; and a central structure mechanically linking said body and said peripheral structure, said central mechanically linking structure being configured to transfer heat radially, i.e. perpendicularly to the longitudinal axis, between the body and the peripheral structure.

According to the invention, the central mechanically linking structure is located radially between said body and said peripheral structure.

The body may be configured to furthermore contain a heating element in its center. The body may then advantageously comprise an insulating shim in its center, which shim is intended to support the heating element and electrically insulate it.

Advantageously, the central mechanically linking structure has a dimension along the longitudinal axis smaller than that of the body, the central position along said longitudinal axis of said central mechanically linking structure being close to the central position along said longitudinal axis of said body.

In variants of the invention, the body is a hollow cylinder. The inside and outside radii of said cylinder are advantageously chosen depending for example on the targeted level of nuclear heating (mass of the sample), on the sensitivity desired for the sample holder and on the size of the channel to be scrutinized.

In variants of the invention, the central mechanically linking structure is an annulus.

In variants of the invention, the peripheral structure is of cylindrical annular shape.

The thickness of the peripheral structure may be chosen depending on the size of the nuclear-reactor channel, the targeted sensitivity and the targeted level of nuclear heating, though it must ensure its mechanical strength.

In variants of the invention, the body and/or the central mechanically linking structure and/or the peripheral structure may be made of stainless steel, aluminum, graphite, or any material compatible with nuclear irradiation.

In variants of the invention, the central mechanically linking structure is unapertured.

In variants of the invention, the central mechanically linking structure is apertured and comprises one or more unitary elements placed radially between said body and said peripheral structure. The central mechanically linking structure may thus take the form of N sectors of equivalent areas distributed uniformly between the body and the peripheral structure, N being higher than or equal to 2. Typically, the central mechanically linking structure may be an annulus cut to form 4 or 8 sectors of equivalent areas distributed uniformly between the body and the peripheral structure.

Typically, the central mechanically linking structure may have a height chosen depending on the desired sensitivity and the targeted level of nuclear heating.

The other subject of the invention is a calorimeter cell, for the measurement of nuclear heating in a nuclear reactor, comprising:

at least one sample holder according to the invention;
a casing in which said sample holder is placed; and
temperature-measuring means.

The casing may advantageously comprise a gas, possibly for example xenon or nitrogen or neon or helium, and be gas-tight.

In variants of the invention, the temperature-measuring means comprise:

first temperature-measuring means for measuring temperature, which means are located at the interface between the body intended to contain a sample and the central mechanically linking structure;

second temperature-measuring means for measuring temperature, which means are located at the interface between the central mechanically linking structure and the peripheral structure said first and second temperature-measuring means allowing the nuclear heating to be determined from measurements at a hotspot and measurements at a cold spot.

In variants of the invention, the temperature-measuring means may be thermocouples formed by structural elements of the sample holder which are made of different metals:

said body intended to contain the sample made of a first metal;

said central mechanically linking structure made of a second metal;

said peripheral structure made of a third metal or of the first metal.

In variants of the invention, the calorimeter cell includes at least two sample holders.

The sample holders may be oriented longitudinally and placed one above the other along a main axis that is perpendicular to the radial axis of each sample holder.

They may also be oriented transversely and placed one above the other along a main axis that is parallel to the radial axis of each sample holder.

In variants of the invention, the calorimeter cell comprises a single casing encapsulating the one or more sample holders.

In variants of the invention, the casing makes contact with the one or more peripheral structures of the one or more sample holders.

In variants of the invention, the calorimeter cell comprises means for introducing a gas into the interior of said casing.

In variants of the invention, the casing includes unitary compartments each containing one sample holder so as to insulate the sample holders from one another.

In variants of the invention, the casing includes linking portions linking the compartments together and said linking portions include means for making a heat-transfer fluid flow through said linking portions.

BRIEF DESCRIPTION OF THE DRAWINGS

The invention will be better understood and other advantages will become apparent on reading the following non-limiting description, which is given with reference to the figures, in which.

DETAILED DESCRIPTION

According to the present invention, the sample holder for the measurement of nuclear heating in a nuclear reactor comprises a body configured to contain a sample for which the deposited energy induced by radiation/matter interactions is to be quantified and means for removing heat from the body to the exterior of the sample holder. These means include a peripheral structure located on the periphery of said body and a central structure mechanically linking said body and said peripheral structure, said central linking structure being configured to transfer heat radially between the body and the peripheral structure. Such a sample holder is configured to be integrated into a calorimeter cell including a seal-tight casing.

Advantageously, the central mechanically linking structure is of smaller longitudinal dimension than the body and the peripheral structure and is positioned halfway up the body, thus generating what are called upper and lower free spaces.

A sample holder of cylindrical shape is described in detail below, but any shape other than a cylindrical shape may be used, with a central mechanically linking structure configured to allow radial removal of heat.

Figure 1A:
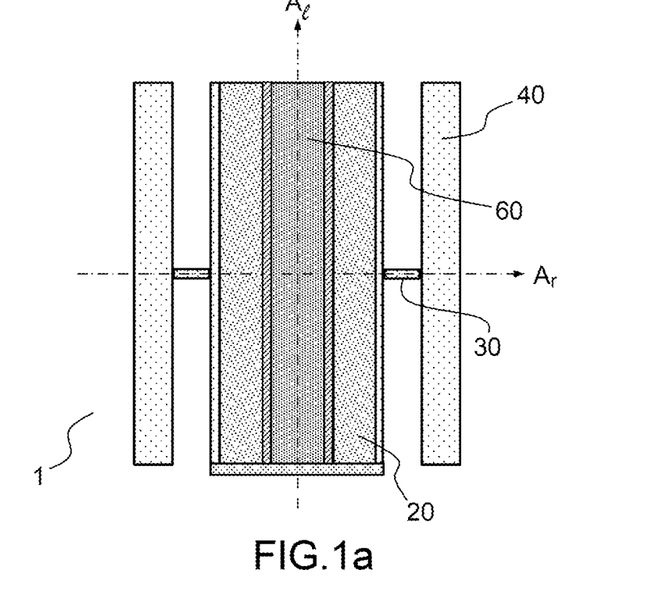
FIGS. 1a and 1b illustrate a sample holder according to the invention without a sample and with a sample, respectively.
Figure 1B:
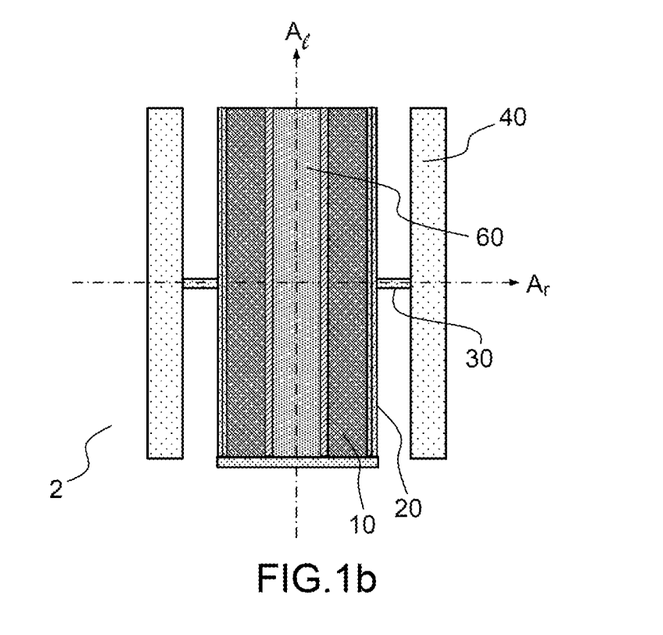

FIG. 1a schematically shows a cross-sectional view of an example of a sample holder 1 not filled with a sample, said sample holder being equipped, in its center, with a heating element. More precisely, according to this example, the sample holder includes a cylindrical central body 20 having a longitudinal axis $A_l$, an annulus-type central mechanically linking structure 30, a peripheral structure 40, and a heating element 60, a radial axis $A_r$ being defined, linking from the center to the periphery, the elements 20, 30 and 40. FIG. 1b shows a cross-sectional view of the same type of sample holder 2 filled with a sample 10.

When the sample holder is integrated into a seal-tight casing in order to define a calorimeter cell, the heating element serves, in a non-radiative medium, for the preliminary calibration of said cell. It then allows the nuclear heating to be simulated locally by joule heating. It may furthermore be used in a reactor in the context of the measurement methods said to be "de zéro" or "d'addition de courant", in which methods it is necessary to deliver additional energy in addition to the energy deposited by the radiation/matter interaction, as described in patent FR 2 968 448.

The central mechanically linking structure allows heat to be transferred radially (conductive directional flow) from the central body to the peripheral structure, this peripheral structure making contact with the casing of the calorimeter cell and thus allowing the energy deposited in said calorimeter cell to be removed.

Figure 2:
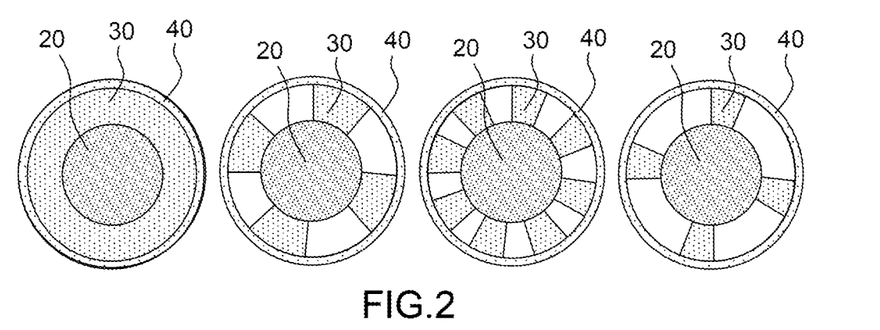
FIG. 2 illustrates various examples of annulus-type central mechanically linking structures able to be used in a sample holder according to the invention.

The central linking structure may have various configurations and may in particular be apertured in order to adjust the sensitivity of the sensor, the structure then consisting of a set of unitary elements of greater or lesser area. Certain examples of configurations are given below and illustrated by virtue of FIG. 2, which shows various annuli configurations for central structures 30 for mechanically linking the central body 20 and the peripheral structure 40. From left to right, these various configurations of the central mechanically linking structure are respectively an unapertured annulus and a partially apertured annulus including either 4 large sectors or 8 sectors, or 4 sectors of smaller heat-exchange area than the configuration containing 4 sectors of larger area.

Figure 3:
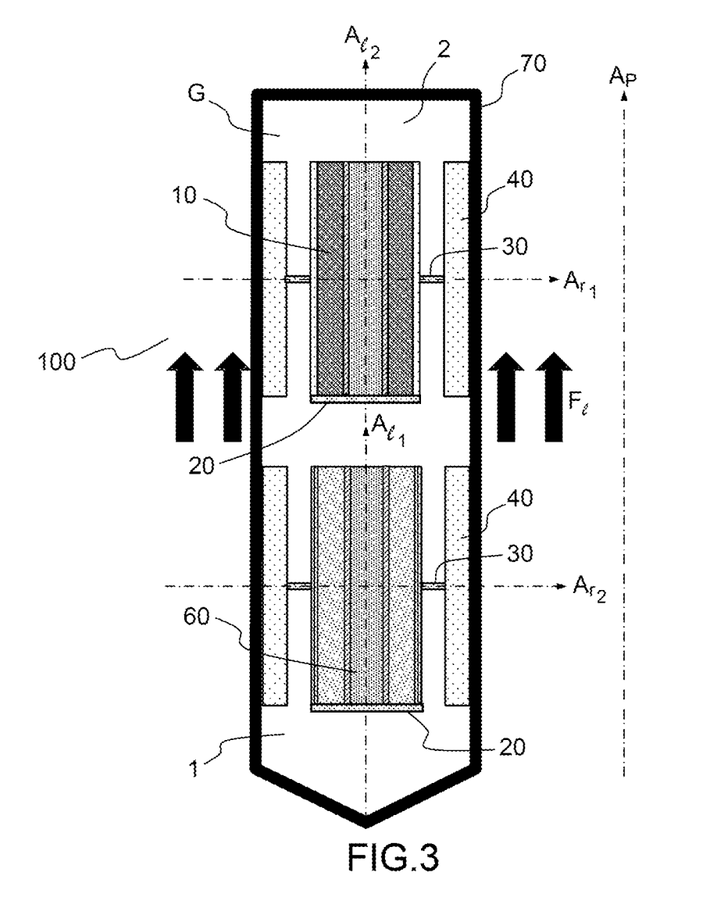
FIG. 3 illustrates a first example of a calorimeter cell of the present invention comprising two sample holders, one containing a sample.

To produce the calorimetric cell, the sample holder or the sample holders are positioned in a casing allowing all of the sample holders to be encapsulated. FIG. 3 thus illustrates a calorimeter-cell configuration in which the calorimeter cell 100 comprises a casing 70 encapsulating two sample holders including, according to the invention, a body 20, a central mechanically linking structure 30 and a peripheral structure 40, the casing making contact with said peripheral structure, the casing generally making contact with a flow of heat-transfer fluid $F_f$. A gas G is present in said casing, allowing sensitivity to be adjusted depending on its thermal conductivity. In order to determine the nuclear heating from a differential measurement, one of the sample holders includes a sample 10, but not the other (sample holder 1 without sample, sample holder 2 with sample).

This casing may be made of metal, in particular of stainless steel. It may be a simple casing as illustrated in FIG. 3 or of a casing comprising compartments, each of the compartments enclosing a sample holder as shown in FIG. 4, the compartmentalized casing allowing the two cells to be thermally insulated from each other.

Figure 4:
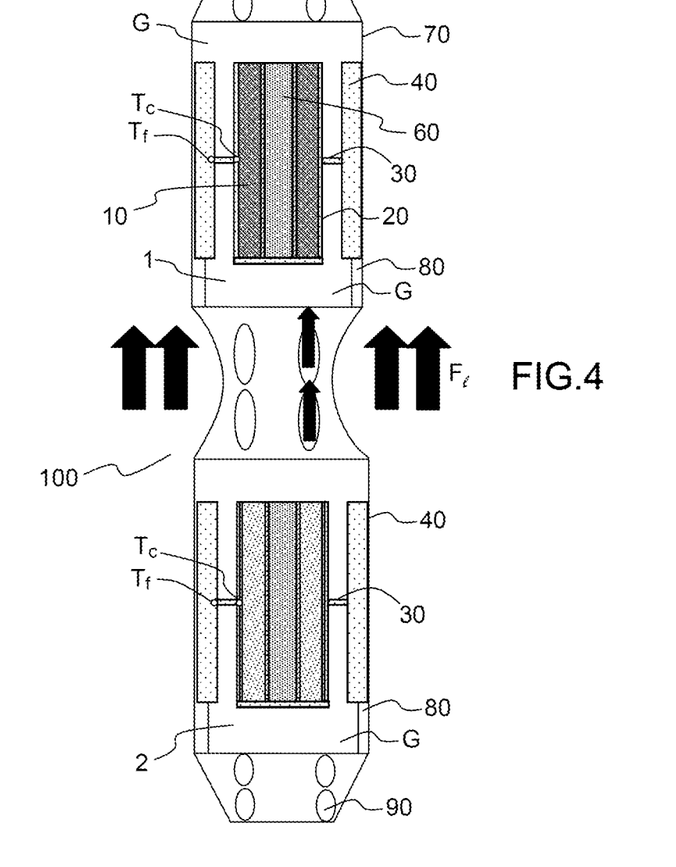
FIG. 4 illustrates a second example of a calorimeter cell of the present invention comprising two sample holders, one containing a sample.

In FIG. 4, shims or mechanical spacers 80 are provided in sufficient number to hold the sample holders in the casing 70 longitudinally.

Advantageously, the casing may furthermore be equipped in its central portion and at its ends, with apertures 90 allowing the heat-transfer fluid in which the calorimeter cell is placed to pass.

In these configurations, the sample holders are oriented longitudinally along a main axis $A_p$, said axis being perpendicular to each radial axis $A_{r1}$ and $A_{r2}$ of the sample holders of longitudinal axis $A_{l1}$ and $A_{l2}$, respectively.

The Applicants have studied the thermal behavior of a calorimeter cell incorporating a sample holder of the invention, by applying a 1D analytical thermal approach (steady-state regime, thermal conductivity of each material constant) to evaluate the sensitivity of the sensor. Sensitivity then corresponds to the calculated equivalent thermal resistance $R_{12equivalent}$ between the two points where the temperatures $T_c$ and $T_f$ are measured, namely the interface between the body and the central mechanically linking structure and the interface between the central mechanically linking structure and the peripheral structure, respectively.

$$P = \frac{T_c - T_f}{R_{12} \text{ equivalent}}$$

Figure 5:
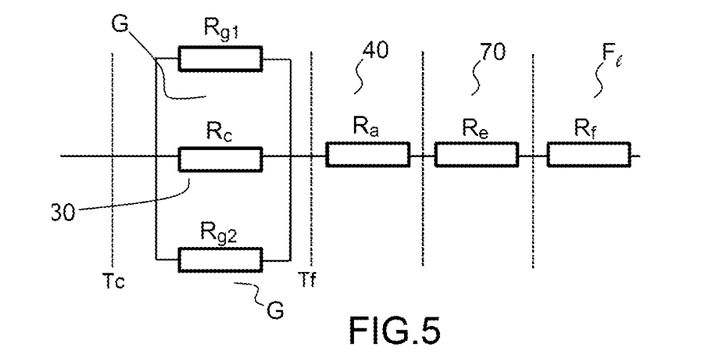
FIG. 5 shows the diagram of the various thermal resistances of the various elements involved in heat exchange in the context of a calorimeter cell including a sample holder of the invention.

The diagram of the various thermal resistances with the following references is given in FIG. 5:
  Rc: the thermal resistance of the central mechanically linking structure 30;
  $R_{g1}$: the thermal resistance of the gas of the upper surrounding gas layer;
  $R_{g2}$: the thermal resistance of the gas of the lower surrounding gas layer;
  Ra: the thermal resistance of the peripheral structure 40;
  Re: the thermal resistance of the casing 70; and
  Rf: the thermal resistance of the fluid exterior to the cell.

In the case where purely conductive heat transfer is considered, the equivalent resistance corresponds to the three parallel relative conductive resistances i.e. Rc, $R_{g1}$ and $R_{g2}$, respectively.

Figure 6:
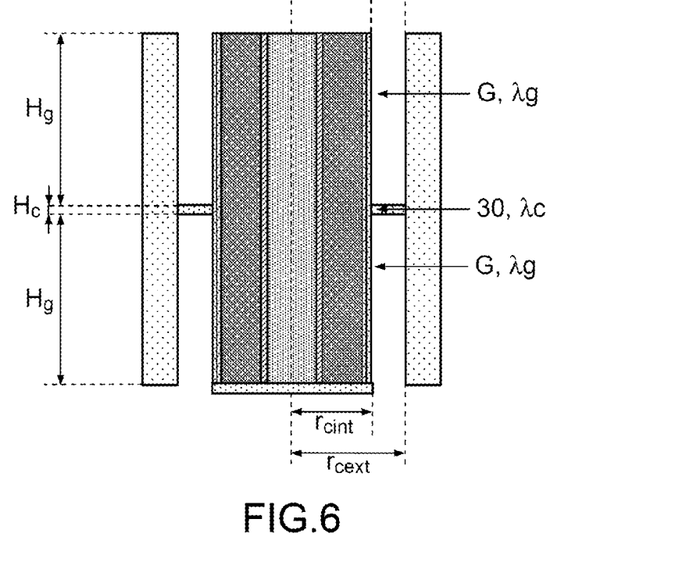
FIG. 6 shows the heights and radii of elements taken into account in the calculations of thermal resistance in the context of a calorimeter cell including a sample holder of the invention.

FIG. 6 illustrates:
  the heights Hg of gas;
  the height Hc of the central mechanically linking structure;
  the inside and outside radii of the central mechanically linking structure i.e. $r_{cint}$ and $r_{cext}$, respectively;
  the thermal conductivity $\lambda_g$ of the gas G; and
  the thermal conductivity $\lambda_c$ of the central mechanically linking structure.

The equivalent thermal resistance is thus defined by the following equation:

$$R_{12equivalent} = \frac{1}{\frac{1}{\frac{\ln\frac{r_{cext}}{r_{cint}}}{2\pi\lambda_g H_g}} + \frac{1}{\frac{\ln\frac{r_{cext}}{r_{cint}}}{2\pi\lambda_g H_g}} + \frac{1}{\frac{\ln\frac{r_{cext}}{r_{cint}}}{2\pi\lambda_c H_c}}}$$

This makes it possible to identify, via a simplified model, the first parameters influencing the value of the sensitivity of the calorimeter cell, namely: the thermal conductivity of the material from which the central mechanically linking structure is made from and of the gas present in the casing, and the size of the mechanical linking structure (thickness/height).

Figure 7:
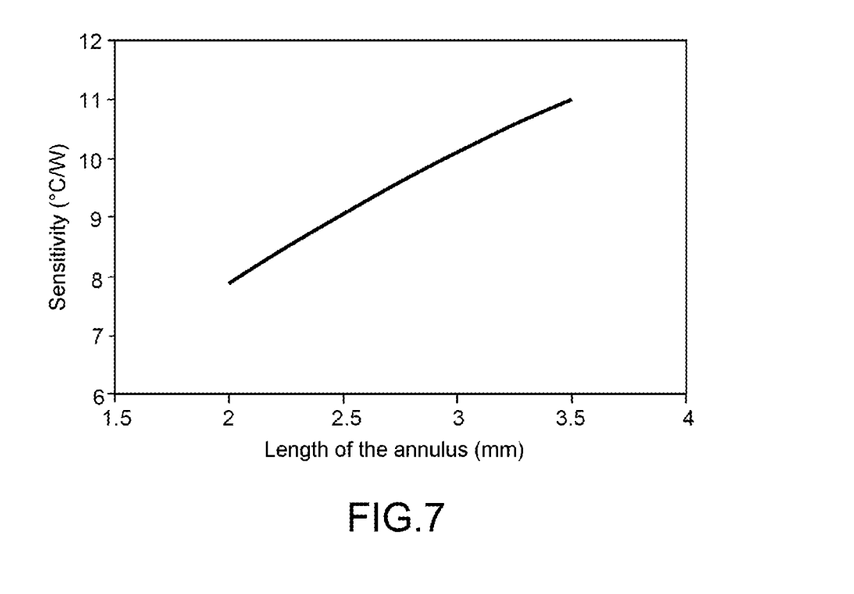
FIG. 7 illustrates the variation in the sensitivity of the response of the sample holder in ° C./W obtained with an example of a sample holder of the invention as a function of the length of the central mechanically linking structure.
Figure 8:
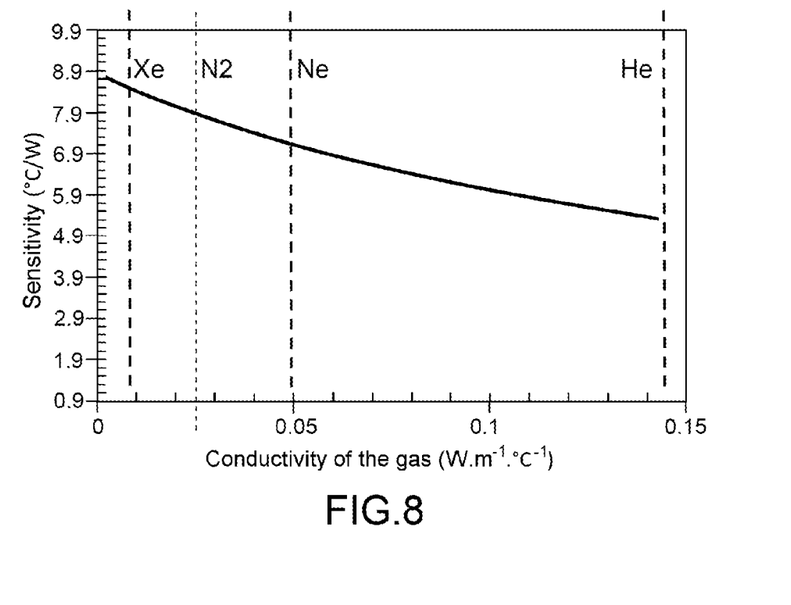
FIG. 8 illustrates the variation in this sensitivity obtained with an example of a sample holder of the invention as a function of the conductivity of the gas employed in a calorimeter cell including said sample holder.
Figure 9:
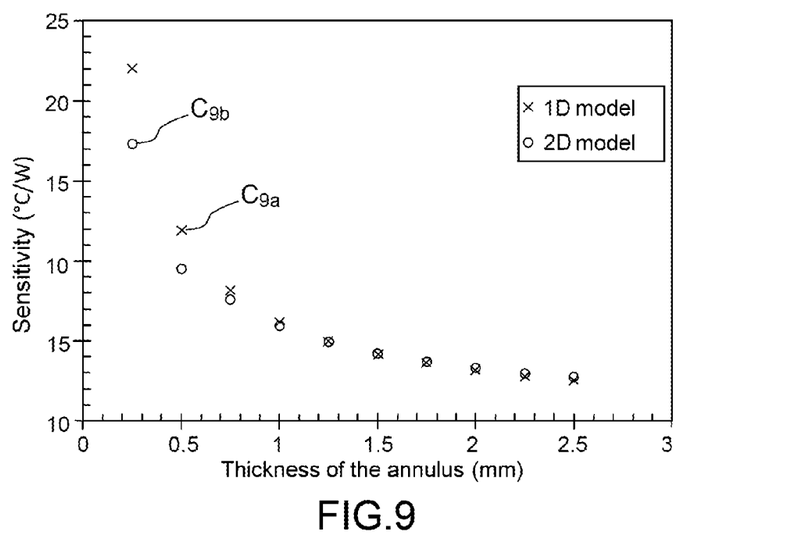
FIG. 9 illustrates the variation in this sensitivity obtained with an example of a sample holder of the invention as a function of the thickness/height of the central mechanically linking structure in a calorimeter cell including said sample holder.

Axisymmetric thermal 2D numerical simulations using the finite-element method have also been carried out in order to parametrically study the response of a calorimeter cell in the case of a configuration with a void-free annulus (unapertured annulus). Results are provided for the case of an "unapertured annulus" type cell made of stainless steel containing a graphite sample and a coefficient of transfer to the exterior of the casing set equal to 200 W/($°$ Cm$^2$), and are illustrated in FIG. 7, as regards the variation in sensitivity as a function of the length (along the axis $A_r$) of the central mechanically linking structure. FIG. 8 relates to the variation in sensitivity as a function of the conductivity of the gas present in the calorimeter cell. FIG. 9 relates to the variation in sensitivity as a function of the thickness of the central mechanically linking structure (obtained with a 1D simulation model: points $C_{9a}$ and a 2D simulation model: points $C_{9b}$).

These curves confirm that it is possible to vary the length of the central mechanically linking structure (in the present case an annulus), its thickness and the nature of the gas to tailor the sensitivity of the sensor to the targeted energy deposition. For example, under the tested conditions, the sensitivity of the cell may be varied by a factor of 10 by modifying the thickness of the annulus from 2.5 mm to 0.25 mm. The smaller the thickness, the greater the sensitivity and therefore the more readily the calorimeter cell can detect small variations in deposited energy.

Figure 10:
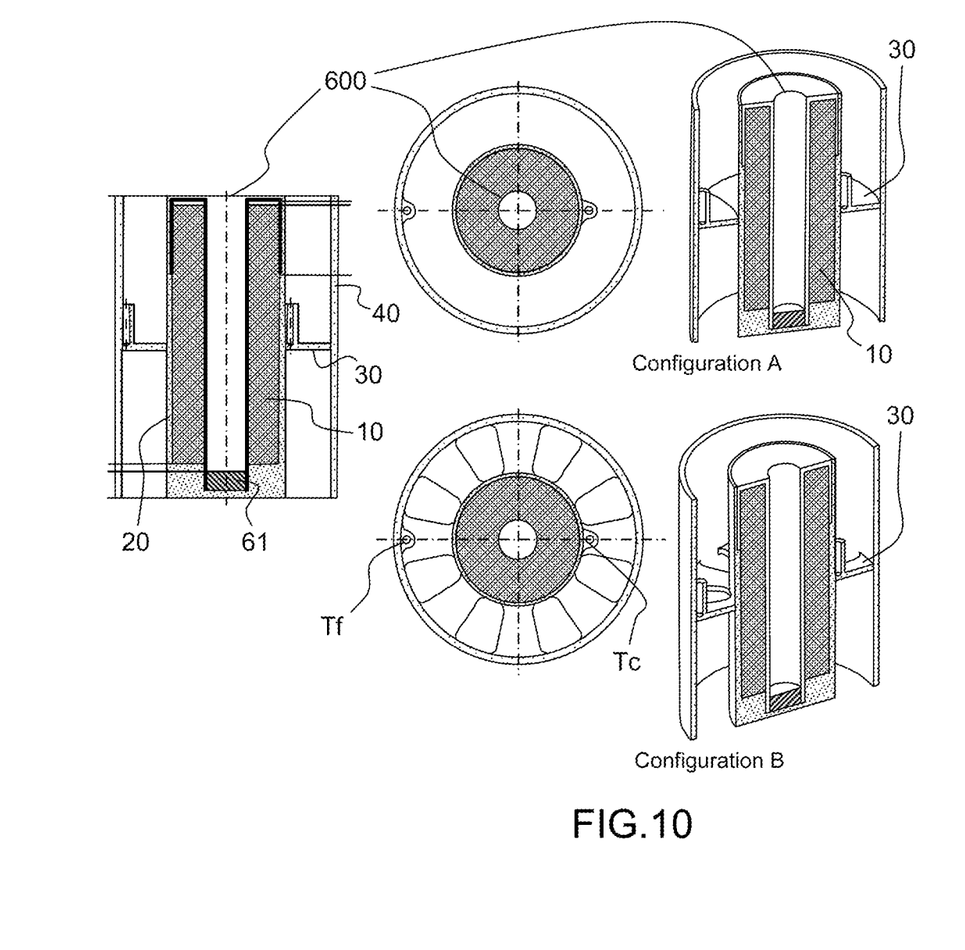
FIG. 10 illustrates vertical cross sections, views from above and 3D vertical cross sections of two examples of configurations of sample holders of the invention.

On the basis of the results obtained from the parametric studies, the Applicants have produced two examples of calorimeter cells and have calibrated them in a non-irradiated medium by simulating nuclear heating at the center of the sample with joule heating by a heating element. FIG. 10 shows the two configurations that were produced in stainless steel, namely a configuration with an unapertured annulus (called configuration A) and a configuration with a regularly 50% apertured configuration (called configuration B). An electrically insulating shim 61, which may be made of alumina, may advantageously be provided to support the heating element.

The top views show examples of the positions at which the temperature measurements may be made (thermocouples positioned at two points) in order to collect the temperatures $T_f$ and $T_c$ defined above. The cross-sectional views show the location 600 dedicated to the heating element, the sample 10, the apertured or unapertured central mechanically linking structure 30, the peripheral structure 40, and the insulating shim 61.

Figure 11:
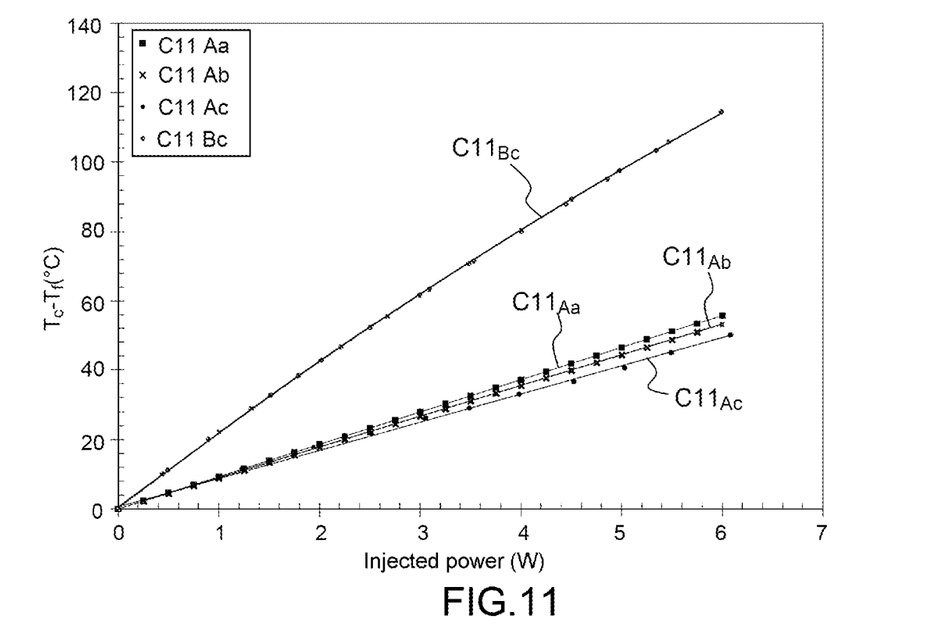
FIG. 11 illustrates examples of response curves in terms of temperature difference as a function of the injected power, the temperatures being measured at the interface between the body and central mechanically linking structure and at the interface between the central mechanically linking structure and the peripheral structure.

FIG. 11 illustrates the results obtained in terms of temperature difference Tc–Tf (expressed in $°$ C.) as a function of injected power (expressed in W), namely:
  curve $C_{11Aa}$, a theoretical analytical calculation for configuration A;
  curve $C_{11Ab}$, a thermal simulation of configuration A;
  curve $C_{11Ac}$, experimental results for configuration A; and
  curve $C_{11Bc}$, experimental results for configuration B.

The response curves of these two configurations were obtained in the case of convective through-wall exchange with a laminar flow (exterior flow of water at 23$°$ C.). They on the one hand show that the experimental and 1D-theoretical results and 2D numerical simulations agree in the case of configuration A. On the other hand, these curves indicate that the cell corresponding to an apertured annulus configuration (configuration B) allows the sensitivity of the sensor to be increased with respect to the cell with the unapertured annulus (configuration A). Configuration B has a sensitivity more than two times higher than that of configuration A (respectively ~19.9$°$ C./W and ~8.4$°$ C./W in the particular case studied here).

This result is of particular interest in the case of measurements of lower levels of nuclear heating or with a view to increasing precision while decreasing the total deposition in the cell.

In the case of higher levels of nuclear heating (in the core of an experimental reactor), it is possible to change another parameter, namely the total height of each cell. Decreasing height makes it possible, while maintaining an equivalent sensitivity in ° C./W, to decrease the amount of matter interacting with the radiation, and therefore to decrease the energy deposited and the temperatures reached.

This size decrease also allows the influence of axial gradients to be decreased, thereby allowing:

the sensor to be fitted into a single measurement cell;

or measurements to be carried out, in order to determine the nuclear heating, with two cells (with sample and without sample, respectively) and without any movement;

or cells with samples of different nature to be used.

Figure 12A:
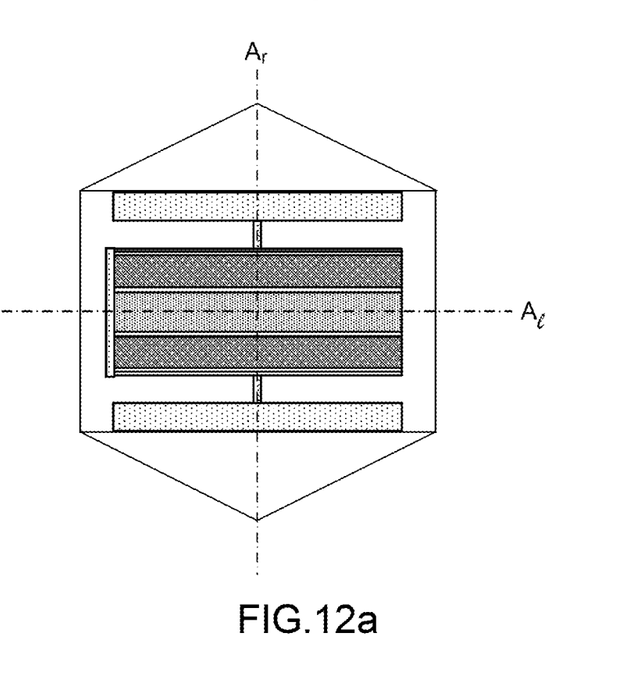
FIGS. 12a and 12b show a configuration in which the sample holder is oriented transversely in its casing, and a cell incorporating two sample holders oriented transversely to a main axis that is parallel to the radial axis of each sample holder.
Figure 12B:
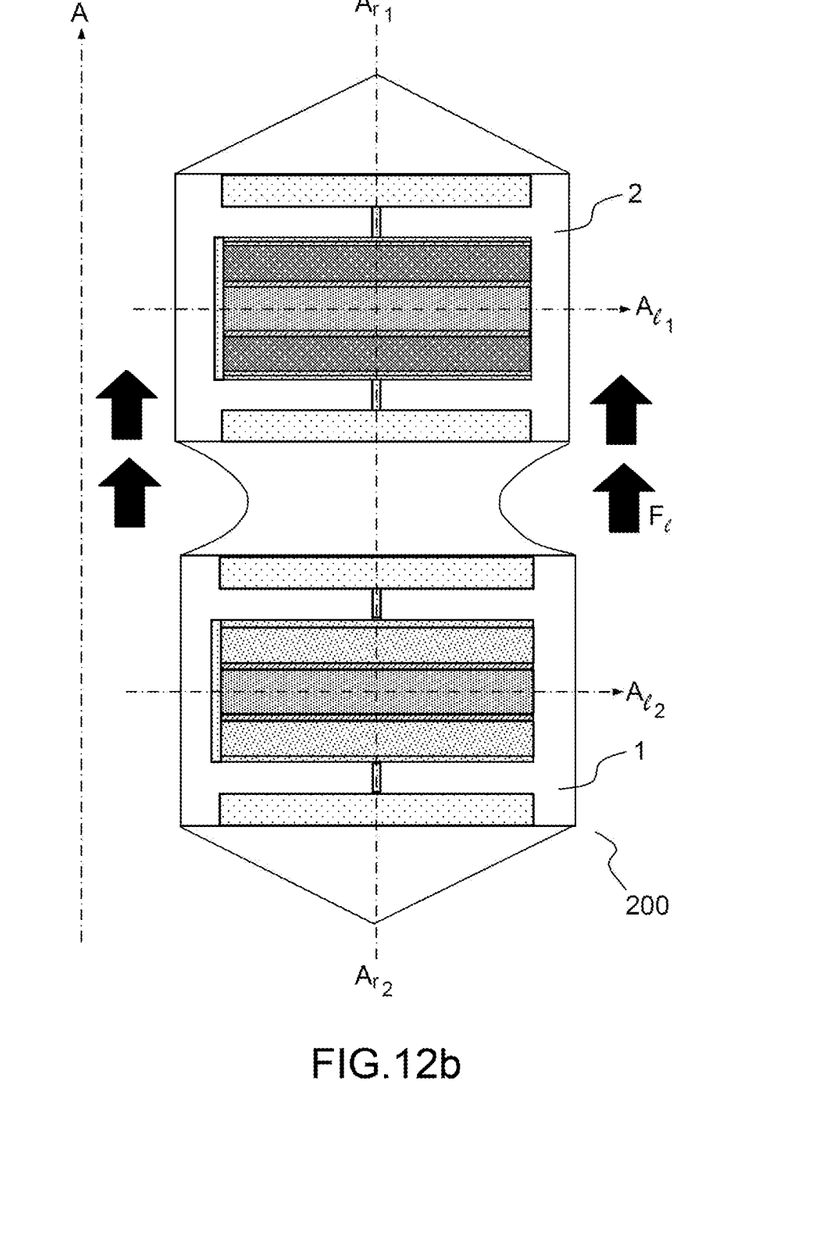

Because of the ability to decrease the size of each cell (decrease in height), it becomes possible to integrate the sensor horizontally into channels of a diameter larger than the height of a cell with 1 or 2 cells. This allows the influence of axial gradients on the deposition in the sample to be decreased. Such a configuration is illustrated in FIG. 12a, which shows the longitudinal axis Ai and the radial axis $A_r$ of a sample holder. FIG. 12b shows two sample holders having a longitudinal unitary axis $A_{l1}$ and $A_{l2}$ and radial axes $A_{r1}$ and $A_{r2}$ that are placed in a given calorimeter cell 200 along a main cell axis $A_p$ that is parallel to the axes $A_{r1}$ and $A_{r2}$.

The invention claimed is:

1. A calorimeter cell for the measurement of nuclear heating in a nuclear reactor, comprising:
   at least one sample holder for the measurement of nuclear heating in a nuclear reactor comprising:
     a body configured to contain a heat-sensitive sample along a longitudinal axis; and
     means for removing heat from the body to the exterior of the sample holder comprising:
       a peripheral structure located on the periphery of said body; and
       a central structure mechanically linking said body and said peripheral structure,
     said central mechanically linking structure being configured to transfer heat radially or perpendicularly to the longitudinal axis, between the body and the peripheral structure, and being located radially between said body and said peripheral structure;
   a casing in which said sample holder is placed;
   a first temperature-measuring means for measuring temperature ($T_c$), which means are located at the interface between the body intended to contain a sample and the central mechanically linking structure of a sample holder; and
   a second temperature-measuring means for measuring temperature ($T_F$), which means are located at the interface between the central linking structure and the peripheral structure of said sample holder,
   said first and second temperature-measuring means allowing the nuclear heating to be determined from measurements at a hotspot and measurements at a cold spot.

2. The calorimeter cell as claimed in claim 1, the body of a sample holder being configured to further contain a heating element in its center.

3. The calorimeter cell as claimed in claim 2, the body of a sample holder further comprising a central insulating shim in its center, which shim is intended to support the heating element and electrically insulate it from the body.

4. The calorimeter cell as claimed in claim 1, the body of a sample holder being a hollow cylinder.

5. The calorimeter cell as claimed in claim 4, the central linking structure of a sample holder being an annulus.

6. The calorimeter cell as claimed in claim 4, the peripheral structure of a sample holder being of cylindrical annular shape.

7. The calorimeter cell as claimed in claim 1, the central mechanically linking structure of a sample holder being apertured and comprising one or more unitary elements placed radially between the body and the peripheral structure of said sample holder.

8. The calorimeter cell as claimed in claim 7, the central mechanically linking structure of said sample holder taking the form of N sectors of equivalent areas distributed uniformly between the body and the peripheral structure of said sample holder, N being higher than or equal to 2.

9. The calorimeter cell as claimed in claim 1, wherein the casing contains a gas and is gas-tight, the gas being xenon or nitrogen or neon or helium.

10. The calorimeter cell as claimed in claim 1, the temperature-measuring means integrated into the sample holder being thermocouples formed by structural elements of said sample holder which are made of different metals:
   said body intended to contain the sample made of a first metal;
   said central mechanically linking structure made of a second metal;
   said peripheral structure made of a third metal or of the first metal.

11. The calorimeter cell as claimed in claim 1, comprising at least two sample holders.

12. The calorimeter cell as claimed in claim 11, wherein the sample holders are oriented longitudinally and placed one above the other along a main axis ($A_p$) that is perpendicular to the radial axis ($A_{r1}$, $A_{r2}$) of each sample holder.

13. The calorimeter cell as claimed in claim 11, wherein the sample holders are oriented transversely and placed one above the other along a main axis ($A_p$) that is parallel to the radial axis ($A_{r1}$, $A_{r2}$) of each sample holder.

14. The calorimeter cell as claimed in claim 1, comprising a single casing encapsulating the one or more sample holders.

15. The calorimeter cell as claimed in claim 14, the casing making contact with the one or more peripheral structures of the one or more sample holders.

16. The calorimeter cell as claimed in claim 14, the casing including unitary compartments each containing one sample holder so as to insulate the sample holders from one another.

17. The calorimeter cell as claimed in claim 16, the casing including linking portions linking the compartments together, said linking portions including means for making a heat-transfer fluid flow through said linking portions.

* * * * *